United States Patent
Fujiwara et al.

(10) Patent No.: US 11,846,602 B2
(45) Date of Patent: Dec. 19, 2023

(54) GAS SENSOR

(71) Applicant: DENSO CORPORATION, Kariya (JP)

(72) Inventors: Ryoji Fujiwara, Kariya (JP); Shusaku Kato, Kariya (JP)

(73) Assignee: DENSO CORPORATION, Kariya (JP)

(*) Notice: Subject to any disclaimer, the term of this patent is extended or adjusted under 35 U.S.C. 154(b) by 317 days.

(21) Appl. No.: 16/720,449

(22) Filed: Dec. 19, 2019

(65) Prior Publication Data

US 2020/0200701 A1   Jun. 25, 2020

(30) Foreign Application Priority Data

Dec. 21, 2018 (JP) .................................. 2018-239666

(51) Int. Cl.
*G01N 27/407* (2006.01)

(52) U.S. Cl.
CPC ..... *G01N 27/4071* (2013.01); *G01N 27/4075* (2013.01)

(58) Field of Classification Search
CPC ........... G01N 27/4071; G01N 27/4075; G01N 27/4078; G01N 27/406–41; G01N 33/0004–0075
See application file for complete search history.

(56) References Cited

U.S. PATENT DOCUMENTS

| | | | |
|---|---|---|---|
| 2003/0116435 A1* | 6/2003 | Satou | G01N 27/4077 204/424 |
| 2005/0131601 A1 | 6/2005 | Kunihiro et al. | |
| 2006/0101900 A1* | 5/2006 | Nishio | G01N 27/407 73/31.05 |
| 2007/0131022 A1 | 6/2007 | Kanao | |
| 2009/0214389 A1 | 8/2009 | Miyata et al. | |

(Continued)

FOREIGN PATENT DOCUMENTS

| | | |
|---|---|---|
| JP | 2002-082085 | 3/2002 |
| JP | 2010-025731 | 2/2010 |

(Continued)

OTHER PUBLICATIONS

NCF601 Spec Sheet (Characteristics of NCF601, downloaded from www.nas-kotai.co.jp/en/purpose/601.html on Jan. 24, 2022) (Year: 2022).*

(Continued)

*Primary Examiner* — Joshua L Allen
(74) *Attorney, Agent, or Firm* — Nixon & Vanderhye, PC (57) ABSTRACT

A gas sensor has a sensor element, a main metal fitting and a buffer fitting made of metal materials. The sensor element has a solid electrolyte body of a cylindrical shape, an outer electrode formed on at least an outer peripheral surface of the solid electrolyte body and a front end side surface of the projecting part, and a porous ceramic layer formed on the front end side surface of the projecting part. The main metal fitting has an insert hole through which the sensor element is inserted and a stair-shaped part projects inwardly from an inner peripheral surface of the insert hole toward a radial direction of the main metal fitting. The buffer fitting is arranged between the porous ceramic layer and the stair-shaped part, and the metal materials which form the buffer fitting have a depassivation pH value of less than 1.0.

15 Claims, 8 Drawing Sheets

(56) References Cited

U.S. PATENT DOCUMENTS

2012/0312685 A1* 12/2012 Kobayashi ......... G01N 27/4078
                                                            204/424
2017/0212090 A1*  7/2017 Kume ............... G01N 33/0009
2017/0307560 A1* 10/2017 Oba .................. G01N 27/4062

FOREIGN PATENT DOCUMENTS

JP          2017-090150       5/2017
JP          2017-134069       8/2017

OTHER PUBLICATIONS

NCF718 Spec Sheet (Data Table for NCF 718, downloaded from https://www.superalloys.net/Grades/Stainless-Steels/31/5358/JIS_NCF_718.pdf on Feb. 13, 2023) (Year: 2023).*

* cited by examiner

GAS SENSOR

CROSS-REFERENCE TO RELATED APPLICATION

This application is related to and claims priority from Japanese Patent Application No. 2018-239666 filed on Dec. 21, 2018, the contents of which are hereby incorporated by reference.

TECHNICAL FIELD

The present disclosure relates to gas sensors.

BACKGROUND

There have been known and used various types of gas sensors such as an air fuel (A/F) ratio sensor, an oxygen sensor, etc. capable of detecting a specific component contained in exhaust gas emitted from internal combustion engines mounted on motor vehicles. Those gas sensors have a structure having a gas sensor element and a main metal fitting. The gas sensor is composed of a solid electrolyte body, a pair of electrodes and a porous ceramic layer. The solid electrolyte body has a cylindrical shape having a bottom part. The pair of electrode are formed on both surfaces of the solid electrolyte body. The solid electrolyte body and the electrode formed on the solid electrolyte body are covered with the porous ceramic layer. Further, it is acceptable to arrange a buffer fitting made of metal between the porous ceramic layer and the main metal fitting so as to buffer a pressure when the sensor element is fixed to the main metal fitting.

A related technique has disclosed a gas sensor having a structure in which a buffer fitting made of a stainless steel is composed of not more than 60% iron and not less than 20% chromium so as to suppress reduction of electronic conductivity caused by a deposition of Fe, dissolved in the buffer fitting, in a porous ceramic layer when the gas sensor is exposed to exhaust gas at a high temperature of not less than 800°.

Such a gas sensor having the buffer fitting made of metal arranged between the porous ceramic layer and the main metal fitting has a following drawback. In a situation in which the gas sensor is mounted on an exhaust gas pipe connected to an internal combustion engine, and a controller supplies a wiring disconnection detection voltage to the gas sensor so as to detect occurrence of disconnection of a wiring of the gas sensor, electrical conductivity of the porous ceramic layer is reduced due to deterioration of the buffer fitting. When the reduction of electrical conductivity of the porous ceramic layer occurs, the wiring disconnection detection voltage, used for detecting an occurrence of a wiring disconnection, is reduced, and the controller detects an incorrect diagnosis regarding occurrence of disconnection of the wiring.

SUMMARY

It is desired for the present disclosure to provide a gas sensor having a sensor element, a main metal fitting and a buffer fitting made of metal materials. The sensor element has a solid electrolyte body of a cylindrical shape, an outer electrode and a porous ceramic layer. The outer electrode is formed on at least an outer peripheral surface of the solid electrolyte body and a front end side surface of the projecting part. The porous ceramic layer is formed on the front end side surface of the projecting part. The main metal fitting has an insert hole and a stair-shaped part. The sensor element is inserted through the insert hole in the gas sensor. The stair-shaped part projects inwardly from an inner peripheral surface of the insert hole toward a radial direction of the main metal fitting. The buffer fitting is arranged between the porous ceramic layer and the stair-shaped part. In particular, the metal materials which form the buffer fitting has a depassivation pH value of less than 1.0.

BRIEF DESCRIPTION OF THE DRAWINGS

A preferred, non-limiting embodiment of the present disclosure will be described by way of example with reference to the accompanying drawings, in which.

DETAILED DESCRIPTION OF THE PREFERRED EMBODIMENTS

The inventors of the present disclosure have studied and recognized that the porous ceramic layer of the gas sensor exposed to the inside of an exhaust gas pipe is immersed into condensed water when water contained in exhaust gas is condensed at a low temperature in the exhaust gas pipe connected to an internal combustion engine.

In general, because condensed water contains chlorine, etc., a concentration of chlorine in the condensed water increases due to a repetition of condensation and drying of condensed water. In addition to this, when metal ions are generated from the buffer fitting of the sensor element in the gas sensor and, a hydrolysis reaction occurs in the condensed water due to metal ions, and a pH value of the condensed water is reduced, i.e. the condensed water is acidified.

When a depassivation pH value of the condensed water becomes lower than the depassivation pH value of the metal materials which form the buffer fitting, it becomes difficult to stably maintain the passivated film on the stainless steel forming the main metal fitting of the gas sensor. As a result, a corrosion occurs in the buffer fitting. Further, a wiring disconnection detection voltage is supplied to the outer electrode of the gas sensor in this situation previously described, generation of iron ions is progressed from the buffer fitting arranged at a cathode side, and the generated iron ions are diffused into the porous ceramic layer of the sensor element, and iron oxide ($Fe_2O_3$) is stably accumulated the porous ceramic layer. This reduces the electrical insulating capability of the porous ceramic layer. In general, such iron oxide ($Fe_2O_3$) accumulated in the porous ceramic layer is an insulating material. However, during the operation of the internal combustion engine when the motor vehicle is driving, exhaust gas emitted from the internal combustion engine contains hydrogen gas and carbon monoxide. When the exhaust gas at a temperature of not less than 400° C. is flowing in the exhaust gas pipe, the iron oxide ($Fe_2O_3$) is reduced and to iron metal (which is a good conductive component) in the exhaust gas at a high temperature. This reduces the electrical insulating capability of the porous ceramic layer of the sensor element, and reduces the electrical insulating capability between the outer electrode of the gas sensor and the main metal fitting connected to the body of the motor vehicle is reduced. The gas sensor according to the present disclosure having the improved structure will be explained later in detail.

That is, it is possible to estimate that the condensed water which has been oxidized has a pH value within a range of 1.0 to 3.0 even if the pH value of the condensed water impregnated into the porous ceramic layer of the sensor element is gradually reduced. Because the metal materials which form the buffer fitting of a gas sensor have a depassivation pH value of less than 1.0, it is possible for the passivated film to maintain the inactive state of the surface of the buffer fitting even if the wiring disconnection detection voltage is continuously supplied to the outer electrode in presence of condensed water in exhaust gas flowing the exhaust gas pipe. This makes it possible for the buffer fitting in the sensor element to stably maintain the anticorrosion capability. The improves structure of the gas sensor according to the present disclosure makes it possible to suppresses occurrence of corrosion of the buffer fitting and to maintain the electrical insulating capability of the porous ceramic layer of the sensor element.

Embodiments of the present disclosure will be described with reference to the accompanying drawings. In the following description of the embodiments, like reference characters or numerals designate like or equivalent component parts throughout the several diagrams.

Exemplary Embodiment

A description will be given of the gas sensor according to an exemplary embodiment of the present disclosure with reference to FIG. 1 to FIG. 6.

Figure 1:
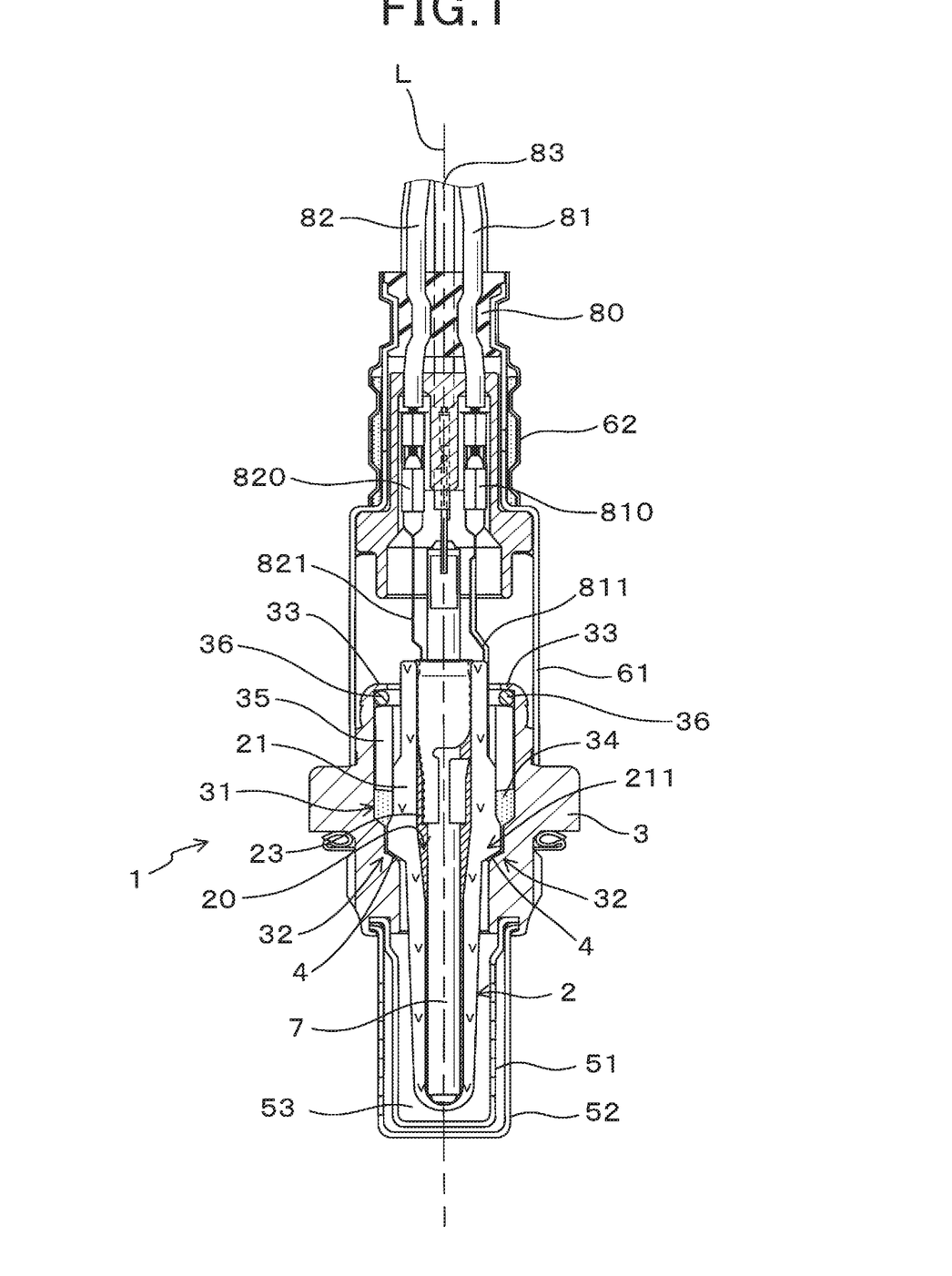
FIG. 1 is view showing a cross section in an axial direction of a gas sensor 1 according to an exemplary embodiment of the present disclosure.

FIG. 1 is view showing a cross section in an axial direction of a gas sensor 1 according to the exemplary embodiment of the present disclosure. As shown in FIG. 1, the gas sensor 1 according to the exemplary embodiment gas a sensor element 2, a main metal fitting 3 and a buffer fitting 4 made of metal.

As shown in FIG. 1, a front end side of the gas sensor 1 is arranged at a bottom side, and a distal end side of the gas sensor 1 is arranged at an upper side along the axial direction L of the gas sensor 1. A diameter direction of the gas sensor 1 is perpendicular to the axial direction L of the gas sensor 1.

Figure 2A:
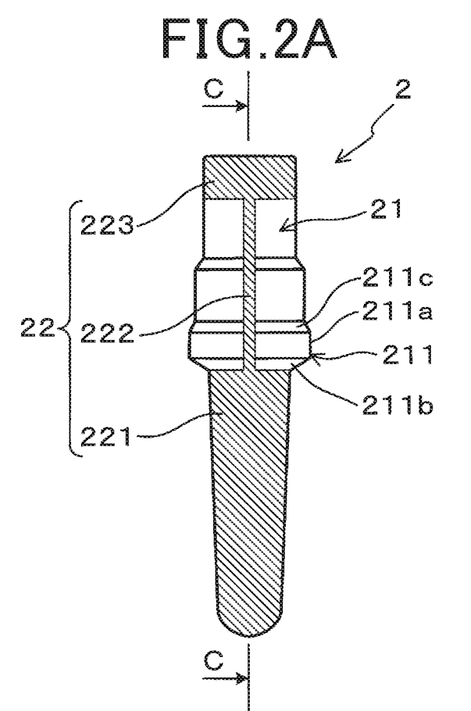
FIG. 2A is an external view of a sensor element 2 in the gas sensor 1 according to the exemplary embodiment shown in FIG. 1, before a porous ceramic layer 24 is formed.
Figure 2B:
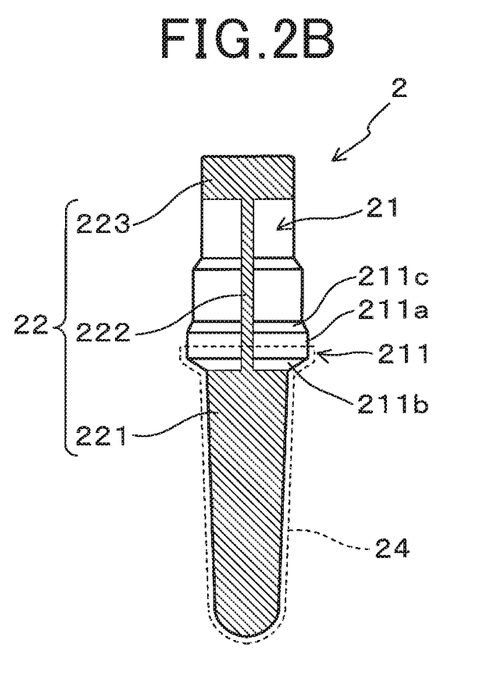
FIG. 2B is an external view of the sensor element 2 in the gas sensor 1 according to the exemplary embodiment shown in FIG. 1 on which the porous ceramic layer 24 has been formed.
Figure 2C:
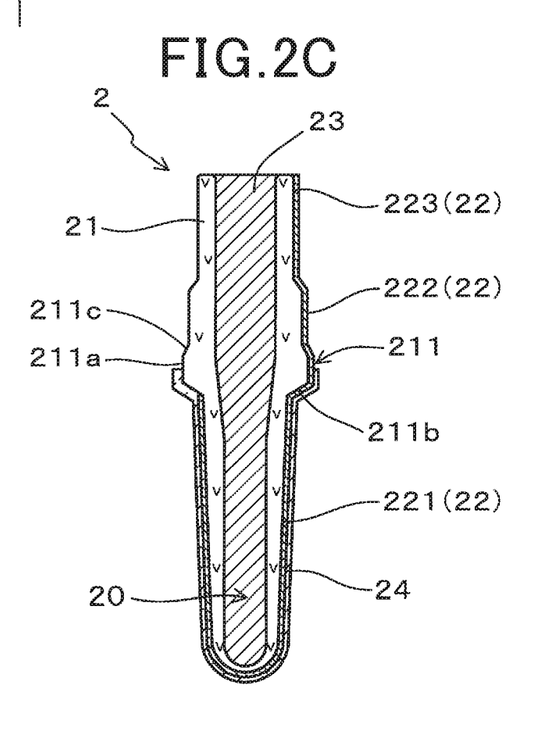
FIG. 2C shows a view showing a cross section of the sensor element 2 in the gas sensor 1 along the line C-C shown in FIG. 2A.

FIG. 2A is an external view of the sensor element 2 in the gas sensor 1 according to the exemplary embodiment shown in FIG. 1, before a porous ceramic layer 24 is formed. FIG. 2B is an external view of the sensor element 2 in the gas sensor 1 according to the exemplary embodiment shown in FIG. 1 on which the porous ceramic layer 24 has been formed. FIG. 2C shows a view showing a cross section of the sensor element 2 in the gas sensor 1 along the line c-c shown in FIG. 2A.

As shown in FIG. 1 and FIG. 2A to FIG. 2C, the sensor element 2 is equipped with a solid electrolyte body 21. The sensor element 2 is formed so that a front end side of the sensor element 2 is closed, and a distal end side of the sensor element 2 is open. In other words, the sensor element 2 has a cup-like shape. In the structure of the sensor element 2, the solid electrolyte body 21 has a projection part 211 which projects outwardly in the radial direction of the sensor element 2.

It is possible to form the solid electrolyte body 21 made of a partially stabilized zirconia or stabilized zirconia having oxygen ion conductivity. It is possible to use, as a stabilizer to be doped in zirconia, Yttria ($Y_2O_3$), Calcia (CaO), Gadria ($Gd_2O_3$), etc.

In the structure of the sensor element 2 in the gas sensor 1 shown in FIG. 1, the projection part 211 has a ring shape and projects outwardly in the radial direction of the sensor element 2. On a cross section of the projection part 211 which is perpendicular to the axial direction L of the gas sensor 1, it is possible to form the projection part 211 to have a rectangular shape, for example a trapezoid shape.

The projection part 211 has a top surface 211a, a front end surface 211b and a distal end surface 211c.

The top surface 211a of the projection part 211 is arranged the outermost side in the radial direction of the sensor element 2 along the axial direction L of the gas sensor 1. The front end surface 211b of the projection part 211 is formed facing the front end side of the sensor element 2. The distal end surface 211c of the projection part 211 is arranged facing the distal end side of the sensor element 2.

When viewed from the front end side of the sensor element 2 along the axial direction L of the gas sensor 1, the front end surface 211b is formed to have a ring shape.

As shown in FIG. 2A, FIG. 2B and FIG. 2C, the front end surface 211b is formed, from an edge part of the front end side at the top surface 211a of the projection part 211, to be inclined at a predetermined angle toward the outer peripheral surface of the solid electrolyte body 21 at the front end side of the sensor element 2. On the other hand, the distal end surface 211c of the projection part 211 is formed to be tilted, from the edge part of the distal end side at the top surface 211a, at a predetermined angle toward the outer peripheral surface of the solid electrolyte body 21 at the distal end side of the sensor element 2.

As shown in FIG. 2A, FIG. 2B and FIG. 2C, the sensor element 2 has an outer electrode 22. The outer electrode 22 is formed at least on the outer peripheral surface (as a cylindrical outside surface) of the solid electrolyte body 21 at the front end side of the sensor element 2 outside from the projection part 211 and on the front end surface 211b of the projection part 211 which faces the front end side of the sensor element 2.

The outer electrode 22 acts as a measurement electrode to be in contact with exhaust gas as a detection target gas. The outer electrode 22 has a detection electrode 221, a lead part 222 and a terminal connection part 223.

The detection electrode 221 is formed on the outer peripheral surface of the solid electrolyte body 21 at the front end side of the sensor element 2 from the projection part 211. The lead part 222 extends from the detection electrode 221 to the distal end side of the sensor element 2. The terminal connection part 223 is connected to an end part of the distal end side of the lead part 222.

As shown in FIG. 2A, FIG. 2B and FIG. 2C, the detection electrode 221 is formed to cover the overall outer peripheral surface of the solid electrolyte body 21 at the front end side of the sensor element 2 from the projection part 211.

It is acceptable to form the detection electrode 221 on a part of the outer peripheral surface of the solid electrolyte body 21 so as to cover the part of the outer peripheral surface of the solid electrolyte body 21 at the front end side of the sensor element 2, viewed from the projection part 211.

As shown in FIG. 2A, FIG. 2B and FIG. 2C, the lead part 222 of a belt shape is formed extending from a part of the edge of the detection electrode 221 at the distal end side of the sensor element 2 toward the distal end side of the sensor element 2 through the surface of the projection part 211 (i.e. the front end surface 211b, the top surface 211a and the distal end surface 211c of the projection part 211).

Further, as shown in FIG. 2A, FIG. 2B and FIG. 2C, the terminal connection part 223 of a ring shape is formed on the outer peripheral surface at the distal end side of the solid electrolyte body 21. For example, the outer electrode 22 is a porous member made of platinum (Pt) or a platinum alloy.

Figure 3:
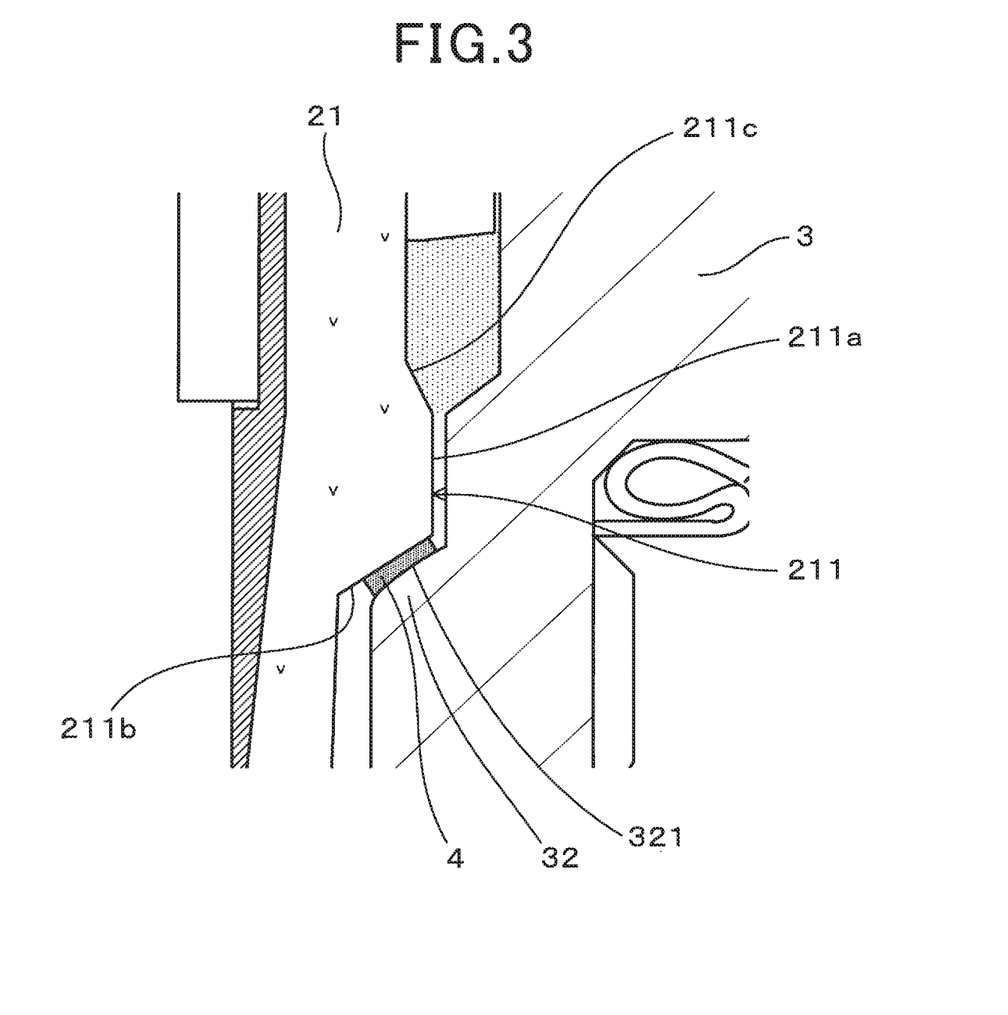
FIG. 3 is a view showing an enlarged structure of the gas sensor 1 shown in FIG. 1, from which a part of a buffer fitting 4 made of metal has been eliminated.

The outer electrode 22 is omitted from FIG. 1 and FIG. 3 for brevity.

As shown in FIG. 1 and FIG. 2A to FIG. 2C, the sensor element 2 has an inner electrode 23 formed on the inner peripheral surface of the solid electrolyte body 21. The inner electrode 23 behaves as a reference electrode to be in contact with the atmosphere. For example, the inner electrode 23 is formed on the overall inner peripheral surface of the solid electrolyte body 21. The inner electrode 23 is a porous member made of Platinum (Pt) or a platinum alloy.

As shown in FIG. 2A, FIG. 2B and FIG. 2C, the sensor element 2 has the porous ceramic layer 24. The porous ceramic layer 24 covers at least the outer electrode 22 formed on the front end surface 211b of the projection part 211 and a part of the lead part 222. For example, it is possible to form the porous ceramic layer 24 made of metal oxide such as alumina ($Al_2O_3$), Magnesia alumina spinel ($MgAl_2O_4$), Titania ($TiO_2$), etc.

The porous ceramic layer 24 is formed on the detection electrode 221 and a part of the outer peripheral surface of the solid electrolyte body 21 so as to cover the outer electrode 22 formed on the front end surface 211b, which faces the outer peripheral surface of the solid electrolyte body 21 and the front end side of the projection part 211 so as to protect the electrodes in the sensor element 2 from Sulfur (S), Phosphorus (P), glass poisoned substances contained in exhaust gas.

It is possible to form the porous ceramic layer 24 to cover at least the detection electrode 221 and the lead part 222 formed on the front end surface 211b of the projection part 211. FIG. 2A, FIG. 2B and FIG. 2C shows the structure of the sensor element 2 in which the porous ceramic layer 24 covers at least a part of the lead part 222 formed on the top surface 211a of the projection part 211 in addition to the front end surface 211b of the projection part 211.

The porous ceramic layer 24 is omitted from FIG. 1 and FIG. 3 for brevity.

FIG. 3 is a view showing an enlarged structure of the gas sensor 1 shown in FIG. 1, from which a part of a buffer fitting 4 made of metal has been eliminated. As shown in FIG. 1 and FIG. 3, it is possible to use the main metal fitting 3 made of stainless steel, et al. The main metal fitting 3 has a stair-shaped part 32. An insert hole 31 is formed in the main metal fitting 3.

The sensor element 2 is inserted into the insert hole 31 of the main metal fitting 3. The stair-shaped part 32 projects inwardly from the inner peripheral surface of the insert hole 31 toward the radial direction of the main metal fitting 3.

The stair-shaped part 32 supports the sensor element 2. Specifically, it is possible to form the stair-shaped part 32 to have a ring shape and to project inwardly toward the radial direction of the main metal fitting 3 from the inner peripheral surface of the insert hole 31.

It is possible to form a surface 321 of the stair-shaped part 32 to face the front end surface 211b of the projection part 211 in the sensor element 2. It is acceptable to arrange the surface 321 of the stair-shaped part 32 and the front end surface 211b of the projection part 211 in parallel from each other, or not in parallel.

As shown in FIG. 1, the main metal fitting 3 has the stair-shaped part 32 and a caulking part 33. It is possible to support the main metal fitting 3 by using a filler 34, a sleeve 35 and a caulking bracket 36. The filler 34 is made of talc powder, etc. The sleeve 35 is made of alumina, etc. That is, the filler 34 and the sleeve 35 are arranged between the stair-shaped part 32 and the caulking part 33 of the main metal fitting 3. Further, the caulking bracket 36 is arranged at the distal end side of the main metal fitting 3 more than the location of the buffer fitting 4.

Specifically, the projection part 211 of the sensor element 2 is arranged between the filler 34 and the buffer fitting 4 made of metal. This arrangement makes it possible to support the sensor element 2 in the insert hole 31, and possible for the filler 34 to maintain an airtightness in the insert hole 31. The main metal fitting 3 is connected and fixed to a body of a vehicle and is grounded during the use of the gas sensor 1.

In the structure of the gas sensor 1 according to the exemplary embodiment shown in FIG. 1, a front side dual cover is arranged at the front end side of the main metal fitting 3 so as to protect the front end side of the sensor element 2. The front side dual cover is composed of a first front cover 51 and a second front cover 52. In addition, a distal side dual cover is arranged at the distal end side of the main metal fitting 3 so as to protect the distal end side of the sensor element 2. The distal side dual cover is composed of a first distal cover 61 and a second distal cover 62.

A reference gas chamber 20 is formed in the inside area of the sensor element 2. A stick-like heater 7 is arranged in the reference gas chamber 20. A front end side of the stick-like heater 7 is in contact with the inner peripheral surface of the solid electrolyte body 21. The stick-like heater 7 is inserted into and arranged in the inside of the reference gas chamber 20 with maintaining a necessary clearance. An elastic insulation member 80 is arranged at the distal end side of the first distal cover 61 and the second distal cover 62 in which lead wiring 81, 82, 83 and 84 are arranged. The lead wiring 84 is omitted from FIG. 1.

A front end side of each of the lead wirings 81 and 82 is electrically connected to respective connection terminals 810 and 820. That is, the terminals 811 and 812 fixed to the front end side of the sensor element 2 are connected to the respective lead wirings 81 and 82 through the connection terminals 810 and 820.

The terminal 811 is connected and fixed to the terminal connection part 223 of the outer electrode 22. The terminal 821 is connected and fixed to the inner electrode 32.

Through the lead wirings 81 and 82, an outside controller (not shown) supplies a wiring disconnection detection voltage having a predetermined voltage to the sensor element 2 in the gas sensor 1. The sensor element 2 transmits a detection signal as a sensor output to the outside controller.

In the structure of the gas sensor 1 according to the exemplary embodiment shown in FIG. 1 to FIG. 4, the outer electrode 22 is connected to a sensor negative (−) terminal of the gas sensor 1, and the inner electrode 23 is connected to a sensor positive terminal (+) of the gas sensor 1. A power supply is supplied to the stick-like heater 7 is arranged in the reference gas chamber 20 through the lead wirings 83 and 84. When receiving the electric power, the stick-like heater 7 generates thermal energy.

Figure 4:
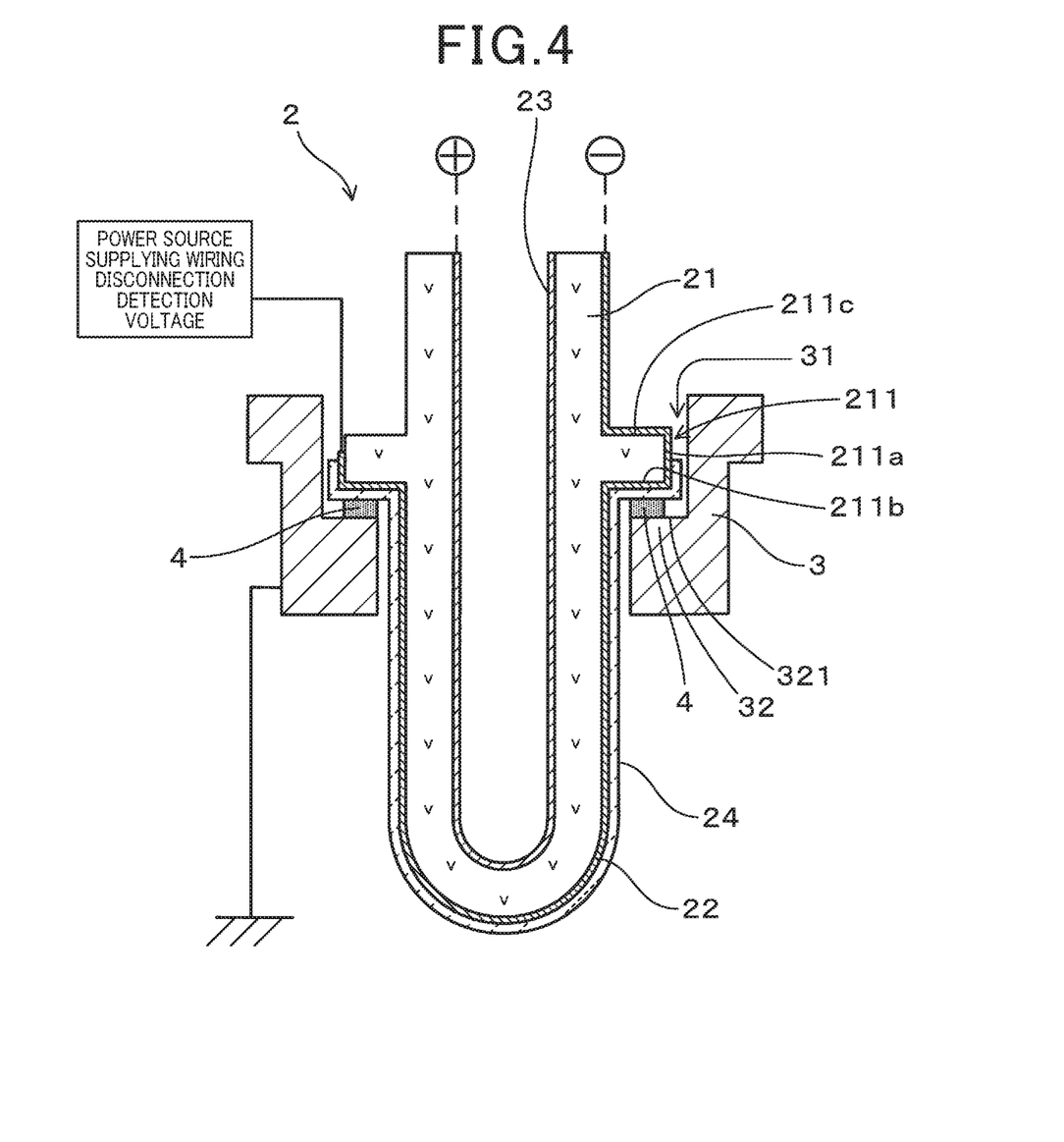
FIG. 4 is a view schematically showing an electrical connection state in the gas sensor 1 according to the exemplary embodiment shown in FIG. 1.

FIG. 4 is a view schematically showing an electrical connection state in the gas sensor 1 according to the exemplary embodiment shown in FIG. 1.

As shown in FIG. 1 to FIG. 4, the buffer fitting 4 made of metal is arranged between the porous ceramic layer 24 and the stair-shaped part 32 of the main metal fitting 3. The porous ceramic layer 24 is formed on the front end surface 211b of the projection part 211 in the sensor element 2.

It is possible to use the main metal fitting 3 having a ring shape. The surface at the front end side of the main metal fitting 3 is arranged to be in contact with the surface 321 of the stair-shaped part 32. The surface at the distal end side of the buffer fitting 4 is arranged to be in contact with the front end surface 211b of the projection part 211 on which the porous ceramic layer 24 is formed. That is, as schematically shown in FIG. 4, the solid electrolyte body 2, the outer electrode 22, the porous ceramic layer 24, the buffer fitting 4 and the main metal fitting 3 are stacked in order.

In the structure of the gas sensor 1 according to the exemplary embodiment shown in FIG. 1 to FIG. 4, metal materials forming the buffer fitting 4 has a depassivation pH value of less than 1.0. This depassivation pH represents a threshold value of an acid resistance of a metal. When reduced less than the depassivation pH value, a metal does not provide its stable corrosion resistance capability. It is possible to detect the depassivation pH value of a metal by the following detection method.

In the detection method, a deaeration NaCl solution of 12 mass % as a reference test solution is prepared, and a low PH solution which has been reduced approximately 0 pH through a filler column composed of a cation exchange resin.

Next, a test sample containing metal materials forming the buffer fitting 4 is prepared. The test sample of the buffer fitting 4 is polished using #800 SiC waterproof abrasive paper (according to Japanese Industrial standards). After this, cathodic reduction of the test sample is performed in $H_2SO_4$ solution of 50 mass % at the room temperature for 60 minutes using a voltage of −750 mV. After this process, a pre-treatment of the test sample is performed for five minutes using 150 mV in the same $H_2SO_4$ solution.

After the pre-treatment, the test sample is washed by using pure water, and speedily immersed into the deaeration NaCl solution of 12 mass % as the reference solution.

The pH of the deaeration NaCl solution of 12 mass % as the reference test solution is reduced by 0.1 every four hours. It is possible to use the PH value, as the depassivation pH value, obtained when a potential of the electrode, i.e. a contact potential difference between the electrode and the reference test solution rapidly is reduced to a negative voltage side after the test sample varies from inactivation to activation.

The reduction of the pH value of the reference test solution is performed as follows.

When the pH value of the reference test solution is reduced to the value of 1, a pH reduction solution is gradually added into the reference test solution. This makes it possible to gradually reduce the pH value of the reference test solution.

When the pH value of 1 of the reference test solution is reduced to zero, a dilute hydrochloric acid is added into the reference test solution so as to reduce the pH value of the reference test solution, where the dilute hydrochloric acid is produced by adding 82.48 mass % pure water into a 52 mass % hydrochloric acid.

When the pH value of 1 of the reference test solution is reduced to not less than zero, a hydrochloric acid is added directly into the reference test solution so as to reduce the pH value of the reference test solution.

It is preferable to use the metal materials forming the buffer fitting 4 having a depassivation pH value of not more than 0.8, more preferable not more than 0.5, or not more than 0.3, most preferable not more than zero, and still preferable not more than −0.1 in order to have a corrosion suppression effect of the buffer fitting 4 when a specified voltage is supplied to the outer electrode 22 in presence of condensed water contained in exhaust gas.

It is possible to use the metal materials containing Fe to form the buffer fitting 4, where a content of Fe is not more than 60 mass %. This structure of the buffer fitting 4 makes it possible to have the corrosion suppressing effect when the specified voltage is supplied to the outer electrode 22 in presence of condensed water contained in exhaust gas.

Further, it is possible for the gas sensor 1 having the structure according to the exemplary embodiment previously described to suppress Fe ions from being dissolved into the porous ceramic layer 24 even if a corrosion is generated in the buffer fitting 4.

In view of obtaining the corrosion suppression effect of the buffer fitting 4 previously described, it is preferable to use the metal material containing Fe of not more than 57 mass %, more preferable not more than 54 mass %, or not more than 50 mass %, or not more than 48.3 mass %, or not more than 45 mass %, and most preferable not more than 40 mass %.

It is possible for the metal materials forming the buffer fitting 4 to contain chromium (Cr). Chromium (Cr) is a metal element to contribute the reduction of the depassivation pH value of a metal material. Specifically, chromium is an element necessary to form a passive film on a surface of the metal material. The more the addition amount of chromium is increased, the higher a regeneration speed of the passive film is when a corrosion occurs on the passive film due to chlorine ions. The addition of chromium increases the anticorrosion capability of the buffer fitting 4.

On the other hand, because chromium increases a hardness of the metal materials forming the buffer fitting 4, adding an excess amount of chromium into the metal materials reduces the buffering capability of the buffer fitting 4 arranged between the sensor element 2 and the main metal fitting 3. From the viewpoint previously described, it is possible to add chromium of less than 22 mass % to the metal material to form the buffer fitting 4.

It is preferable to add chromium of not more than 21.5 mass %, more preferable of not more than 21 mass %, further preferable of not more than 20 mass %, and of not more than 19 mass %, and most preferable of not more than 18 mass %.

From the viewpoint to ensure the effect of the chromium addition, it is preferable to add chromium of not less than 10 mass %, further preferable of not less than 12 mass %, more preferable of not less than 14 mass %, and most preferable of not less than 16 mass %.

It is possible for the metal materials forming the buffer fitting 4 to contain nickel (Ni) which is a metal element to reduce the depassivation pH value of the metal materials.

Although nickel does not increase a hardness of the passive film formed on the surface of the metal material, the presence of nickel prevents corrosion of the buffer fitting 4. That is, nickel is an effective metal element to increase the anticorrosion of the buffer fitting 4.

On the other hand, because nickel contributes to increase a hardness of the metal materials forming the buffer fitting 4, adding nickel of an excess amount reduces the buffering capability of the buffer fitting 4 which is arranged between the sensor element 2 and the main metal fitting 3. From the viewpoint previously described, it is possible to add nickel of not more than 75 mass % to the metal material to form the buffer fitting 4. It is preferable to add nickel of not more than 70 mass %, more preferable of not more than 65 mass %, and most preferable of not more than 60 mass %.

From the viewpoint to ensure the effect of the nickel addition, it is preferable to add nickel of not less than 15 mass %, more preferable of not less than 19 mass %, and further preferable of not less than 40 mass %, and most preferable of not less than 45 mass %.

It is further possible for the metal materials forming the buffer fitting 4 to contain molybdenum (Mo). Molybdenum is a metal element capable of reducing the depassivation pH value of the metal material. Specifically, molybdenum is an effective metal element to increase the anticorrosion because molybdenum contributes to promote the function of regenerating the passive film when a corrosion occurs on the passive film due to chlorine ions.

On the other hand, because molybdenum reduces a hardness of the metal materials, adding molybdenum of an excess amount reduces the buffering capability of the buffer fitting 4 arranged between the sensor element 2 and the main metal fitting 3. From the viewpoint previously described, it is possible to add molybdenum of not more than 5 mass % to the metal materials which form the buffer fitting 4. It is preferable to add molybdenum of not more than 4.5 mass %, more preferable of not more than 4 mass %, and most preferable of not more than 3.5 mass %.

From the viewpoint to ensure the effect of the molybdenum addition, it is preferable to add molybdenum of not less than 2 mass %, more preferable of not less than 2.3 mass %, and further preferable of not less than 2.5 mass %, and most preferable of not less than 2.7 mass %.

It is possible to use any combination of metal materials previously described so as to produce the buffer fitting 4. Specifically, it is possible to produce the buffer fitting 4 using a combination of metal materials of iron (Fe), chromium (Cr) and nickel (Ni). It is also possible to produce the buffer fitting 4 using a combination of metal materials of iron (Fe), chromium (Cr), nickel (Ni) and molybdenum (Mo). It is also acceptable to add a combination of at least one or more from carbon (C), silicon (Si), manganese (Mn), phosphorus (P), sulfur (S), et al. into metal materials to be used for producing the buffer fitting 4. It is possible to use any content of each element contained in the metal materials so as to produce the buffer fitting 4.

Specifically, it is possible to use a nickel alloy such as NCF718, NCF601, NCF750, etc. (according to Japanese Industrial Standards) to form the buffer fitting 4. The use of a nickel alloy makes it possible to obtain corrosion suppression effects as the anticorrosion effects in a situation in which the wiring disconnection detection voltage having a predetermined voltage is applied to the outer electrode 22 in the atmosphere containing condensed water contained in exhaust gas.

It is possible for the gas sensor 1 according to the exemplary embodiment to have the buffer fitting 4 composed of the metal materials having a hardness of not more than HV350 (according to Japanese Industrial Standards). It is possible to use the hardness of each metal material by using a micro Vickers hardness meter based on JIS2244 (JIS represents the Japanese Industrial Standards).

Specifically, a hardness detection test is performed at first and second hardness detection points on a main surface of and a third hardness detection point in a central point of the metal material forming the buffer fitting 4. The hardness detection method calculates an average hardness as the hardness of the metal material based on the detected hardness values of the three hardness detection points. The use of the three hardness detection points does not break the buffer function of the buffer fitting 4 arranged between the sensor element 2 and the main metal fitting 3, and avoids the sensor element 2 from being damaged due to the hardness detection method. It is preferable for the metal material forming the buffer fitting 4 to have a hardness of not more than HV330, more preferable of not more than HV300, and most preferable of not more than HV295.

When the metal materials forming the buffer fitting 4 has a hardness of, which has been detected, more than a predetermined hardness value due to chromium (Cr), nickel (Ni), molybdenum (Mo), etc. contained therein, it is necessary to perform an annealing process, etc., so as to reduce the hardness of the metal material less than the predetermined hardness value. This makes it possible for the buffer fitting 4 to have its necessary buffer function and to prevent the sensor element 2 from being damaged.

The wiring disconnection detection voltage having a predetermined voltage is supplied to the outer electrode 22 of the gas sensor 1 so as to detect the occurrence of a wiring disconnection in the gas sensor 1.

FIG. 4 shows the electrical connection state of the gas sensor 1 having the sensor element 2. As shown in FIG. 4, the main metal fitting 3 is earthed or grounded because the main metal fitting 3 of the gas sensor 1 is connected to a body of a motor vehicle (not shown).

The buffer fitting 4 is supported between the porous ceramic layer 24 of the sensor element 2 and the main metal fitting 3 of the gas sensor 1. The buffer fitting 4 is earthed or grounded because the buffer fitting 4 is arranged to be in contact with the main metal fitting 3.

As shown in FIG. 4, a sensor circuit is arranged so that the outer electrode 22 of the sensor element 2 in the gas sensor 1 is electrically connected to a negative terminal side, and the inner electrode 23 is electrically connected to a sensor positive electrode side. That is, the outer electrode 22 is electrically connected to a sensor negative electrode, and the inner electrode 23 is electrically connected to a sensor positive electrode.

Further, the outer electrode 22 is arranged to receive the wiring disconnection detection voltage. It is possible to use the wiring disconnection detection voltage of not less than 0.1 V, and not more than 2.0 V so as to prevent characteristic variation of the sensor element 2 due to an excess current.

Figure 5:
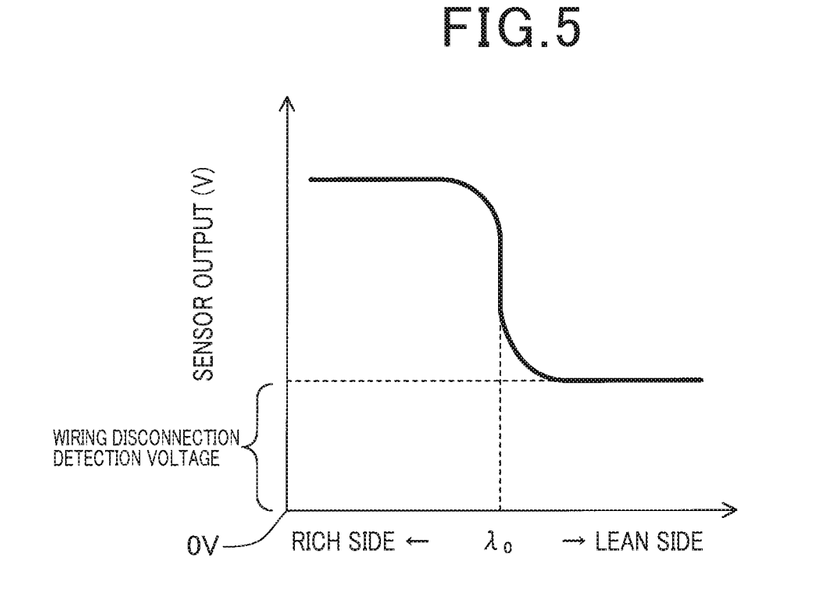
FIG. 5 is a view schematically explaining a relationship between an air/fuel ratio (A/F ratio) and a sensor output when a wiring disconnection detection voltage is supplied to an outer electrode of the gas sensor shown in FIG. 1 when no wiring disconnection occurs.

FIG. 5 is a view schematically explaining a relationship between an air/fuel ratio (A/F ratio) and a sensor output of the gas sensor 1 when the wiring disconnection detection voltage is supplied to the outer electrode 22 of the gas sensor 1 shown in FIG. 1 when no wiring disconnection occurs.

As shown in FIG. 5, in a rich reducing gas contained in exhaust gas when no wiring disconnection occurs in the gas sensor 1, because a predetermined output voltage is generated in the gas sensor 1, the total sensor output of the gas sensor 1 is a sum of the predetermined output voltage and the wiring disconnection detection voltage which is supplied to the outer electrode 22.

On the other hand, in a lean reducing gas contained in exhaust gas when no wiring disconnection occurs in the gas sensor 1, because the output voltage of the gas sensor 1 becomes approximately zero, the total sensor output of the gas sensor 1 is substantially equal to the wiring disconnection detection voltage which is supplied to the outer electrode 22.

Figure 6:
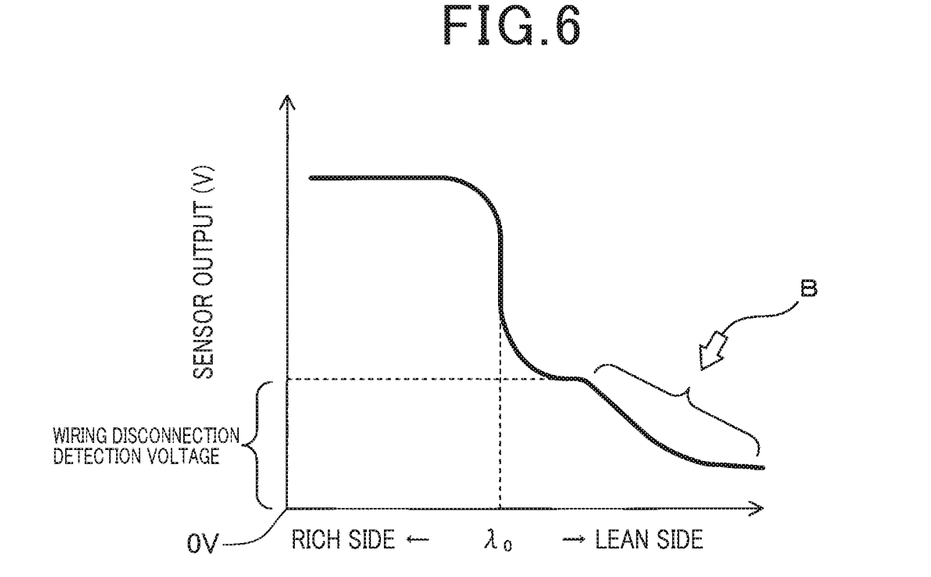
FIG. 6 is a view schematically explaining a relationship between the A/F ratio and the sensor output of the gas sensor when the wiring disconnection detection voltage is supplied to the outer electrode of the gas sensor shown in FIG. 1 when a wiring disconnection has occurred.

FIG. 6 is a view schematically explaining a relationship between the A/F ratio and the sensor output of the gas sensor 1 when the wiring disconnection detection voltage is supplied to the outer electrode 22 of the gas sensor 1 shown in FIG. 1 when a wiring disconnection has occurred;

As designated by the arrow B shown in FIG. 6, when a wiring disconnection occurs in the gas sensor 1, the output voltage of the gas sensor 1 approaches substantially zero voltage which is lower than the wiring disconnection detection voltage. This detection makes it possible to correctly detect the occurrence of a wiring disconnection in the gas sensor 1.

The gas sensor 1 according to the exemplary embodiment has the improved structure in which the depassivation pH value of the metal materials forming the buffer fitting 4 is less than 1.0. It is thereby possible to maintain an inactive state of the passive film on the buffer fitting 4 even if the wiring disconnection detection voltage is continuously supplied to the outer electrode 22 in presence of condensed water contained in exhaust gas. As a result, the buffer fitting 4 continuously maintains its excellent anti-corrosion capability. This makes it possible for the gas sensor 1 to suppress the progress of corrosion in the buffer fitting 4, and to maintain electrical insulating capability of the porous ceramic layer 24 in the sensor element 2.

Evaluation Experiment

A description will now be given of an experiment of evaluating test samples 1 to 18 as a gas sensor.

In general, when a motor vehicle is running on a road, exhaust gas emitted from an internal combustion engine of the motor vehicle contains a lot of condensed water and is passing through an exhaust gas pipe of the own vehicle. In the situation previously described, the wiring disconnection detection voltage having the predetermined voltage is supplied to the outer electrode 22 of the sensor element 2 of the gas sensor 1, the corrosion occurs in the buffer fitting 4 arranged between the porous ceramic layer 24 and the main metal fitting 3.

After a predetermined period of time counted from the engine start of a motor vehicle has been elapsed and the exhaust gas pipe increases at a temperature of not less than 100° C., condensed water is dried and evaporated. From this point of view, it is not necessary to use a real internal combustion engine so as to obtain the results of the evaluation experiment of the test samples 1 to 18. That is, it is sufficient for the evaluation experiment to perform a repetition of cycles of generation and drying of condensed water derived from exhaust gas in the exhaust gas pipe.

Accordingly, the evaluation experiment has performed the evaluation test of each of the test samples 1 to 18 having the buffer fitting 4 having a different metal structure or composition shown in Table 1. The depassivation pH value of the metal material forming the buffer fitting in each test sample has been measured by the method previously explained. Each of the test samples 1 to 18 is an air/fuel (A/F) sensor.

The evaluation experiment prepared pseudo water as the condensed water contained in exhaust gas of 100 μl and dropped the pseudo water per one time every day around the buffer fitting of each test sample. The pseudo water was prepared by adding 30 ppm $Cl^-$, 400 ppm $NO_2^-$, 400 ppm $NO_3^-$, 300 ppm $SO_3^-$, 1300 ppm $SO_4^{2-}$, 400 ppm HCHO, 400 ppm HCOOH, 400 ppm and 2000 ppm $CH_3COOH$ into 1 litter pure water in mass percentage.

Figure 7:
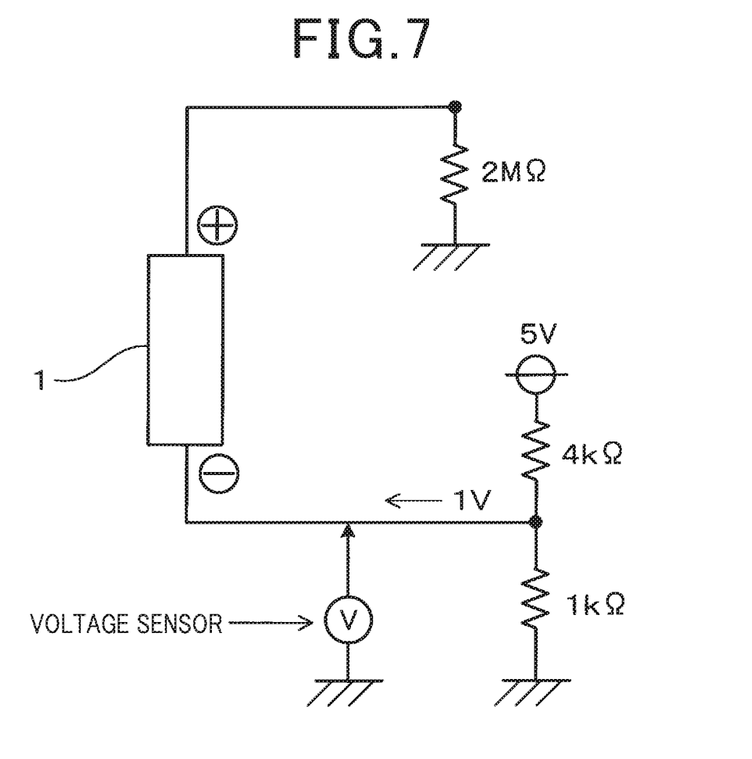
FIG. 7 is a view explaining an evaluation circuit to be connected to the gas sensor 1 during an evaluation test.

FIG. 7 is a view explaining an evaluation circuit to be connected to each of the test samples 1 to 18 as the gas sensor during the evaluation experiment. As shown in FIG. 7, the wiring disconnection detection voltage of 1V was supplied to the outer electrode of each test sample, i.e. through the sensor negative (−) terminal thereof and the main metal fitting of each test sample was earthed or grounded. A positive electrode of the 5V power source shown in FIG. 7 was connected to a 4 kΩ resistance, and a negative electrode of the 5V power source was grounded.

Next, the evaluation experiment performed and evaluated the electrical insulating of the porous ceramic layer of each test sample as follows.

First, each test sample as the gas sensor was placed over three hours in a high temperature and high humidity environment, i.e. at a temperature of 80° C. with 85% humidity. After this, each test sample was placed for three hours in a dry environment, i.e. at a temperature of 20° C. with 0% humidity. These processes were repeated by 30 cycles, 80 cycles, and 150 cycles. The evaluation experiment detected occurrence of failure of each test sample as the gas sensor failure every time of 30 cycles, 80 cycles, and 150 cycles.

Figure 8:
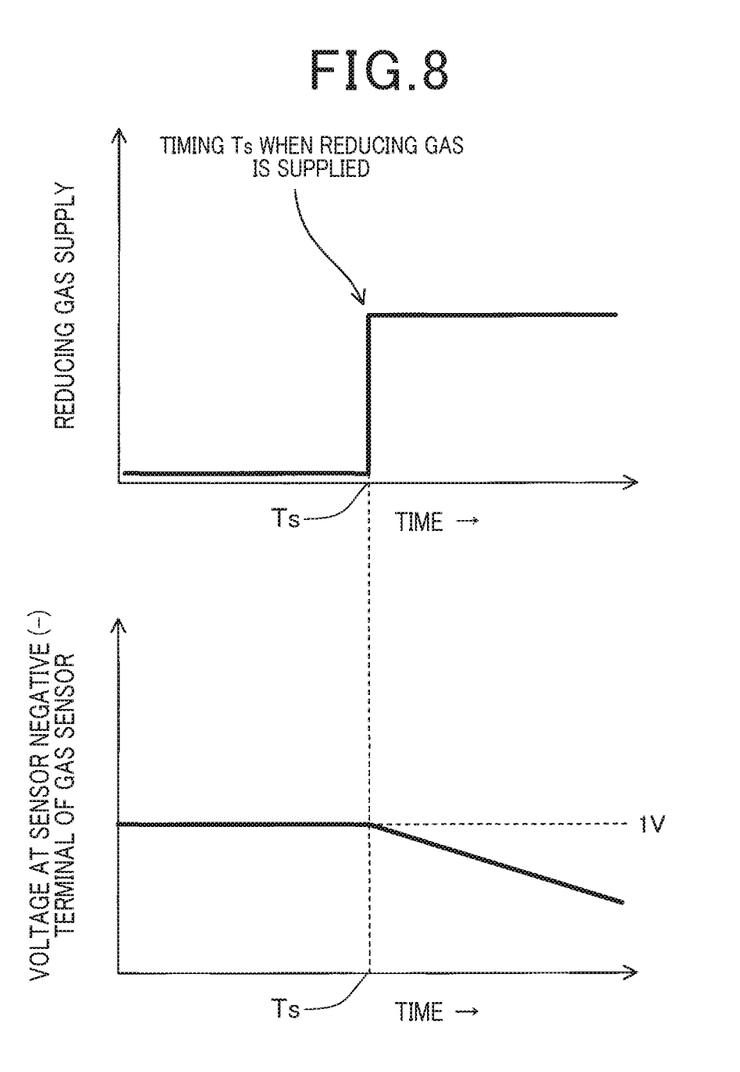
FIG. 8 is a view explaining evaluation results when a gas sensor failure occurs in a test sample.
Figure 9:
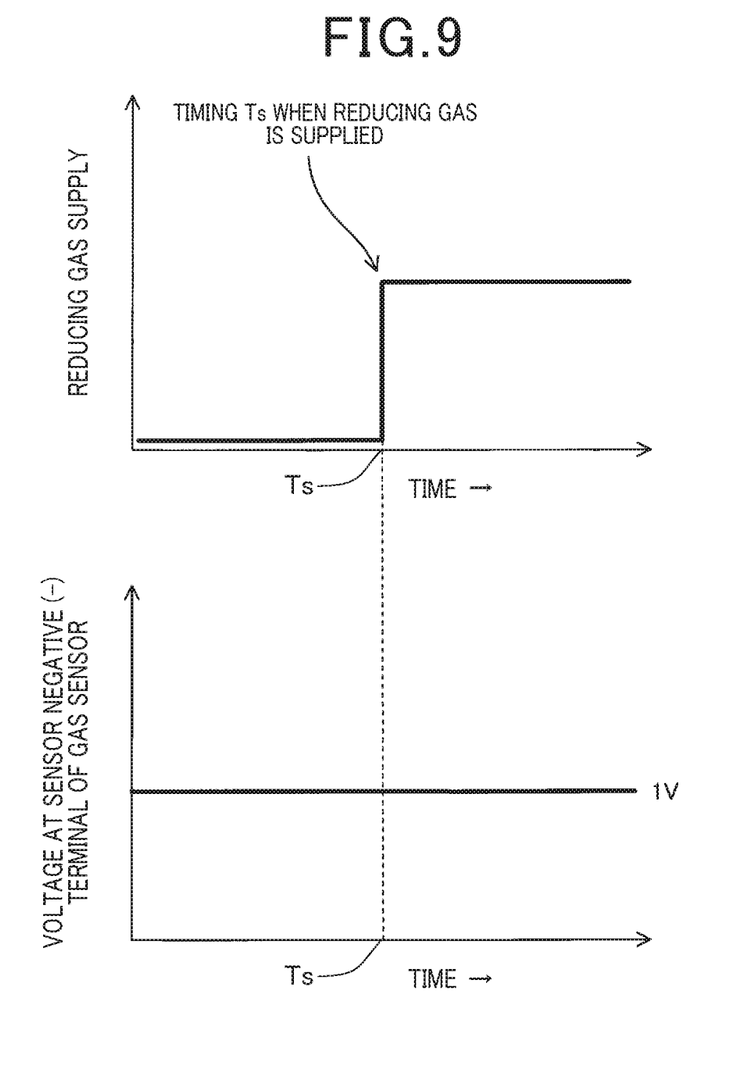
FIG. 9 is a view explaining an evaluation result when the gas sensor is operating normally.

FIG. 8 is a view explaining the evaluation results when a gas sensor failure occurs in a test sample. Accordingly, as shown in FIG. 8, a magnitude of the wiring disconnection detection voltage supplied to the outer electrode which is connected to the sensor negative (−) terminal of each test sample is gradually reduced due to the reduction of the electrical insulating capability of the porous ceramic layer. FIG. 9 is a view explaining an evaluation result when the gas sensor is operating normally.

The evaluation experiment simultaneously performed both heating of each test ample and varying the gas atmosphere around each test sample were.

Next, after the main metal fitting of each test sample was heated at a temperature of not less than 450° C., the wiring disconnection detection voltage of 1 V was supplied to the outer electrode of east test sample through its sensor negative (−) terminal. While supplying the wiring disconnection detection voltage of 1 V to the outer electrode of each test sample, a reducing gas composed of 86 mass % $N_2$, 10 mass % $H_2$ and 3.3 mass % CO) was supplied at a timing Ts (see FIG. 8 and FIG. 9) around each test sample as the gas sensor.

The evaluation test detected a voltage drop amount of the wiring disconnection detection voltage after 5 minutes counted from the timing Ts when the reducing gas was introduced, as shown in FIG. 8 and FIG. 9.

In general, the electrical insulating capability of the porous ceramic layer of each test sample is reduced due to the occurrence of corrosion in the buffer fitting of east test sample due to the repetition of the cycles of generation and drying previously described.

The electrical insulating capability of the porous ceramic layer in the test sample is maintained when no corrosion occurs in the buffer fitting of the test sample after the repetition of the cycles of generation and drying previously described. In this case, as shown in FIG. 9, the magnitude of the corrosion in the buffer fitting supplied to the outer electrode of the test sample is substantially reduced through the sensor negative (−) terminal. The evaluation experiment calculated an electrical resistance value between the outer electrode and the main metal fitting in the test samples, in which the magnitude of the wiring disconnection detection voltage was reduced, on the basis of the magnitude of the voltage drop of the wiring disconnection detection voltage.

The evaluation experiment judges the gas sensor failure has occurred in the test sample when the calculated electrical resistance value becomes not more than 100 kΩ (>=100 kΩ). In the evaluation experiment of detecting a gas sensor failure, the number N of the test samples is five (N=5) per cycle of generation and drying.

Table 1 shows a chemical composition of metal materials forming the main metal fitting in each test sample, the depassivation pH value of each test sample, a hardness of the buffer fitting in each test sample and an evaluation result of each test sample.

TABLE 1

| TEST SAMPLES | METAL MATERIALS FORMING BUFFER FITTING | CHEMICAL COMPOSITION (MASS %) | | | | | | | | |
|---|---|---|---|---|---|---|---|---|---|---|
| | | Ni | Cr | Mo | Fe | C | Si | Mn | P | S |
| 1 | NCF750 | 70 | 14 | — | 5 | 0.08 | 0.50 | 1.00 | 0.01 | 0.015 |
| 2 | SUBSTANTIALLY EQUIVALENT TO NCF750 | 70 | 17 | — | 5~9 | ≤0.08 | ≤0.50 | ≤1.00 | ≤0.01 | ≤0.015 |
| 3 | NCF601 | 58 | 21 | 2.8 | 6.5 | 0.08 | 0.35 | 0.35 | 0.01 | 0.015 |
| 4 | SUBSTANTIALLY EQUIVALENT TO NCF601 | 58-63 | 21~25 | 2.8~3.3 | 10 | ≤0.08 | ≤0.35 | ≤0.35 | ≤0.01 | ≤0.015 |
| 5 | NCF718 | 50 | 17 | 2.8 | 19.6 | 0.08 | 0.35 | 0.35 | 0.01 | 0.015 |
| 6 | SUBSTANTIALLY EQUIVALENT TO NCF718 | 50~55 | 17~21 | 2.8~3.3 | 19.6~30.2 | ≤0.08 | ≤0.35 | ≤0.35 | ≤0.01 | ≤0.015 |
| 7 | SUS310S | 19 | 24 | — | 48.3 | 0.08 | 1.50 | 2.00 | 0.05 | 0.03 |
| 8 | SUBSTANTIALLY EQUIVALENT TO SUS310S | 19~22 | 24~26 | — | 48.3~57 | ≤0.08 | ≤1.50 | ≤2.00 | ≤0.05 | ≤0.03 |
| 9 | SUS316 | 10 | 10 | 2 | 61.8 | 0.1 | 1.0 | 2.0 | 0.05 | 0.03 |
| 10 | SUBSTANTIALLY EQUIVALENT TO SUS316 | 10~14 | 16~18 | 2~3 | 61.8~72 | ≤0.1 | ≤1.0 | ≤2.0 | ≤0.05 | ≤0.03 |
| 11 | SUS304 | 8 | 18 | — | 66.3 | 0.1 | 1.0 | 2.0 | 0.05 | 0.03 |
| 12 | SUBSTANTIALLY EQUIVALENT TO SUS304 | 8~10.5 | 18~20 | — | 66.3~74 | ≤0.1 | ≤1.0 | ≤2.0 | ≤0.05 | ≤0.03 |
| 13 | SUS303 | 8 | 17 | 0.01 | 67.5 | 0.2 | 1.0 | 2.0 | 0.2 | 0.2 |
| 14 | SUBSTANTIALLY EQUIVALENT TO SUS303 | 8~10 | 17~19 | ≤0.01 | 67.5~75 | ≤0.2 | ≤1.0 | ≤2.0 | ≤0.2 | ≤0.2 |
| 15 | SUS444 | — | 17 | 1.8 | 75.4 | 0.0 | 1.0 | 1.0 | 0.0 | 0.0 |
| 16 | SUBSTANTIALLY EQUIVALENT TO SUS444 | — | 17~20 | 1.8~2.5 | 75.4~81.3 | ≤0.0 | ≤1.0 | ≤1.0 | ≤0.0 | ≤0.0 |
| 17 | SUS430 | — | 16 | — | 80.1 | 0.1 | 0.8 | 1.0 | 0.0 | 0.0 |
| 18 | SUBSTANTIALLY EQUIVALENT TO SUS430 | — | 16~18 | — | 80.1~84 | ≤0.1 | ≤0.8 | ≤1.0 | ≤0.0 | ≤0.0 |

| TEST SAMPLES | DEPASSIVATION pH VALUE | HARDNESS (HV) | EVALUATION RESULTS (CYCLE NUMBER n) | | |
|---|---|---|---|---|---|
| | | | 30 | 80 | 150 |
| 1 | −0.7 | NOT MORE THAN 280 | 0/5 (WITHOUT FAILURE) | 0/5 (WITHOUT FAILURE) | 0/5 (WITHOUT FAILURE) |
| 2 | −0.7~−0.3 | | ○ | ○ | ○ |
| 3 | −0.6 | NOT MORE THAN 290 | 0/5 (WITHOUT FAILURE) | 0/5 (WITHOUT FAILURE) | 0/5 (WITHOUT FAILURE) |
| 4 | −0.6~−0.2 | | ○ | ○ | ○ |
| 5 | −0.6 | NOT MORE THAN 280 | 0/5 (WITHOUT FAILURE) | 0/5 (WITHOUT FAILURE) | 0/5 (WITHOUT FAILURE) |
| 6 | −0.6~−0.1 | | ○ | ○ | ○ |
| 7 | 1.0 | NOT MORE THAN 187 | 0/5 (WITHOUT FAILURE) | 0/5 (WITHOUT FAILURE) | 1/5 (FAILURE) |
| 8 | 1.0~1.2 | | ○ | ○ | ○ |
| 9 | 1.8 | NOT MORE THAN 187 | 0/5 (WITHOUT FAILURE) | 1/5 (FAILURE) | 2/5 (FAILURE) |
| 10 | 1.8~1.9 | | ○ | X | X |
| 11 | 2.2 | NOT MORE THAN 187 | 4/5 (FAILURE) | 5/5 (FAILURE) | — |

TABLE 1-continued

| | | | | | | |
|---|---|---|---|---|---|---|
| 12 | 2.2~2.5 | | | X | X | — |
| 13 | 2.3 | NOT MORE THAN 187 | 5/5 (FAILURE) | | — | — |
| 14 | 2.3~2.4 | | | X | — | — |
| 15 | 2.3 | NOT MORE THAN 217 | 5/5 (FAILURE) | | — | — |
| 16 | 2.3~2.4 | | | X | — | — |
| 17 | 2.8 | NOT MORE THAN 183 | 5/5 (FAILURE) | | — | — |
| 18 | 2.8~2.9 | | | X | — | — |

As can be understood from the results of the evaluation experiment shown in Table 1, on supplying the wiring disconnection detection voltage to the outer electrode of the test samples (as the gas sensor) in presence of condensed water contained in exhaust gas, the electrical insulating capability of the porous ceramic layer in each of the test samples 7 to 18 was deteriorated, and a gas sensor failure has also occurred. The metal materials which form the buffer fitting in each of the test samples 7 to 18 have the depassivation pH value of not less than 1.0.

On the other hand, the electrical insulating capability of the porous ceramic layer in each of the test samples 1 to 6 was not deteriorated and no gas sensor failure occurred. The metal materials which form the buffer fitting in each of the test samples 1 to 6 have the depassivation pH value of less than 1.0. That is, the evaluation experiment clearly shows that the structure of each of the test samples 1 to 6 suppresses occurrence of corrosion in the buffer fitting, the electrical insulating capability of the porous ceramic layer in each of the test samples 1 to 6 can be maintained, and no gas sensor failure occurred in each of the test samples 1 to 6.

While specific embodiments of the present disclosure have been described in detail, it will be appreciated by those skilled in the art that various modifications and alternatives to those details could be developed in light of the overall teachings of the disclosure. Accordingly, the particular arrangements disclosed are meant to be illustrative only and not limited to the scope of the present disclosure which is to be given the full breadth of the following claims and all equivalents thereof.

What is claimed is:

1. A gas sensor, comprising:
a sensor element;
a sensor circuit;
a main metal fitting; and
a buffer fitting made of metal materials, wherein
the sensor element comprises:
a solid electrolyte body of a cylindrical shape having a bottom part and a projecting part, the projecting part projecting outwardly in an axial direction of the sensor element;
an inner electrode formed on at least an inner peripheral surface of the solid electrolyte body;
an outer electrode formed on at least an outer peripheral surface of the solid electrolyte body and a front end side surface of the projecting part, and receiving a wiring disconnection detection voltage supplied from an outside controller; and
a porous ceramic layer formed on the front end side surface of the projecting part, and covering at least the outer electrode, wherein
an insert hole is formed in the main metal fitting, through which the sensor element is inserted,
the main metal fitting further includes a stair-shaped part having a ring shape and projecting inwardly from an inner peripheral surface of the insert hole toward a radial direction of the main metal fitting, the stair-shaped part supporting the sensor element,
the sensor circuit is configured such that the outer electrode is electrically connected to a negative electrode, the inner electrode is electrically connected to a positive electrode, and the buffer fitting is electrically connected to the main metal fitting grounded,
the sensor circuit is further configured to occur a potential difference between the outer electrode and the buffer fitting,
the buffer fitting is arranged between the porous ceramic layer and the stair-shaped part, and the metal materials forming the buffer fitting have a depassivation pH value of less than 1.0,
a surface of the stair-shaped part is formed to face a front end surface of the projecting part,
the solid electrolyte body, the outer electrode, the porous ceramic layer, the buffer fitting, and the main metal fitting are stacked in order, and
the metal materials forming the buffer fitting contain less than 20 mass % and greater than 10 mass % chromium in the metal materials.

2. The gas sensor according to claim 1, wherein the metal materials forming the buffer fitting contain not more than 60 mass % iron in the metal materials.

3. The gas sensor according to claim 2, wherein the metal materials forming the buffer fitting have a hardness of not more than HV350.

4. The gas sensor according to claim 2, wherein the metal materials forming the buffer fitting contain less than 75 mass % nickel in the metal materials.

5. The gas sensor according to claim 2, wherein the metal materials forming the buffer fitting are composed of a nickel alloy.

6. The gas sensor according to claim 1, wherein the metal materials forming the buffer fitting have a hardness of not more than HV350.

7. The gas sensor according to claim 1, wherein the metal materials forming the buffer fitting contain less than 75 mass % nickel in the metal materials.

8. The gas sensor according to claim 1, wherein the metal materials forming the buffer fitting are composed of a nickel alloy.

9. The gas sensor according to claim 1, wherein the surface of the stair-shaped part and the front end surface of the projecting part are arranged in parallel to each other.

10. The gas sensor according to claim 1, wherein the metal materials forming the buffer fitting contain less than 5 mass % molybdenum in the metal materials.

11. The gas sensor according to claim 1, wherein the solid electrolyte body, the outer electrode, the porous ceramic layer, the buffer fitting, and the main metal fitting are stacked in the order consisting of the solid electrolyte body, the outer electrode, the porous ceramic layer, the buffer fitting, and the main metal fitting.

12. The gas sensor according to claim 1, wherein the metal materials forming the buffer fitting contain more than 45 mass % and less than 55 mass % nickel in the metal materials.

13. The gas sensor according to claim 1, wherein the metal materials forming the buffer fitting contain less than 40 mass % iron.

14. The gas sensor according to claim 1, wherein the metal materials forming the buffer fitting have the depassivation pH value of less than 0.3.

15. A gas sensor, comprising:
   a sensor element;
   a sensor circuit;
   a main metal fitting; and
   a buffer fitting made of metal materials, wherein
   the sensor element comprises:
      a solid electrolyte body of a cylindrical shape having a bottom part and a projecting part, the projecting part projecting outwardly in an axial direction of the sensor element;
      an inner electrode formed on at least an inner peripheral surface of the solid electrolyte body;
      an outer electrode formed on at least an outer peripheral surface of the solid electrolyte body and a front end side surface of the projecting part, and receiving a wiring disconnection detection voltage supplied from an outside controller; and
      a porous ceramic layer formed on the front end side surface of the projecting part, and covering at least the outer electrode, wherein
   an insert hole is formed in the main metal fitting, through which the sensor element is inserted,
   the main metal fitting further includes a stair-shaped part projecting inwardly from an inner peripheral surface of the insert hole toward a radial direction of the main metal fitting, the stair-shaped part supporting the sensor element,
   the sensor circuit is configured such that the outer electrode is electrically connected to a negative electrode, the inner electrode is electrically connected to a positive electrode, and the buffer fitting is electrically connected to the main metal fitting grounded,
   the sensor circuit is further configured to occur a potential difference between the outer electrode and the buffer fitting,
   the buffer fitting is arranged between the porous ceramic layer and the stair-shaped part, and the metal materials forming the buffer fitting have a depassivation pH value of less than 1.0, and
   the metal materials forming the buffer fitting contain less than 20 mass % and greater than 10 mass % chromium in the metal materials.

* * * * *